US 6,496,458 B2

(12) United States Patent
Tsukihashi

(10) Patent No.: US 6,496,458 B2
(45) Date of Patent: Dec. 17, 2002

(54) SYNCHRONIZED DISK RECORDING DEVICE HAVING SPEED VARIATION WITH RECORDING CONDITION

(75) Inventor: Akira Tsukihashi, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 147 days.

(21) Appl. No.: 09/730,662

(22) Filed: Dec. 6, 2000

(65) Prior Publication Data
US 2001/0003519 A1 Jun. 14, 2001

(30) Foreign Application Priority Data
Dec. 13, 1999 (JP) .......................................... 11-353330

(51) Int. Cl.$^7$ ................................................ G11B 5/09
(52) U.S. Cl. ................................ 369/47.47; 369/47.44; 369/53.36
(58) Field of Search ......................... 369/44.13, 44.26, 369/44.27, 44.29, 44.35, 47.14, 44.32, 44.33, 47.38, 47.39, 47.44, 47.47, 47.55, 53.15, 53.3, 53.37, 53.36, 47.45

(56) References Cited
U.S. PATENT DOCUMENTS 5,663,941 A * 9/1997 Aoshima .................. 369/44.35
6,069,858 A * 5/2000 Endo et al. ................. 369/75.1

* cited by examiner

Primary Examiner—Paul W. Huber
(74) Attorney, Agent, or Firm—Hogan & Hartson, LLP

(57) ABSTRACT

When a recording condition judgement section (28) determines a recording condition of the recording of data onto a disk, and the recording is discontinued in response to the decision, a recording speed setting section (29) switches a recording speed to a speed one step slower than the previous recording speed. With this arrangement, when the recording condition is inferior, the recording is discontinued to thereby avoid a recording failure. Moreover, the recording speed is corrected stepwisely so that a disk adaptable recording speed can be set. Further, a recording start position at which to start additional writing is detected by the recording start position detection section (26), and the recording data is synchronized with the recording data by a synchronism setting section (27) to ensure successiveness before and after the recording data connection due to additional writing to the disk, before the recording is resumed 4 Claims, 1 Drawing Sheet

SYNCHRONIZED DISK RECORDING DEVICE HAVING SPEED VARIATION WITH RECORDING CONDITION

BACKGROUND OF THE INVENTION

1. Field of the Invention

The present invention relates to a disk recording device for recording data onto a disk using an optical beam emitted from an optical head, and in particular to a disk recording device of which recording speed is set at a recording speed at which recording data can be recorded onto a disk in use, so as to accommodate differences in recording properties among disks.

2. Description of the Related Art

CD-R (compact disk recordable) and CD-RW (compact disk rewritable) systems are well known systems in which an optical beam from an optical head is used for recording digital data onto a disk. Efforts are constantly being made to increase the recording speeds of these disk recording devices.

Current state of the art CD-R drives are able to record data at a recording speed eight (8×) to twelve (12×) times their standard speed. Current state of the art CD-RW drives can record data at a recording speed twice (2×) or four times (4×) their standard speed.

Disks for use in recording by such disk recording devices differ in material composition depending on manufacturers or adaptable speed grades, and thus different types of disks exhibit different recording properties such as sensitivity, frequency characteristics, and so on.

In disk recording devices, an emission output issued from an optical head is set at an optimum recording level for disk recording according to a recording speed which is set when recording. Alternatively, an emission output issued from an optical head when recording is set at an optimum recording level for compensation of a difference in disk recording properties.

Such setting of an emission output from an optical head at an optimum recording level is achieved through trial writing into an emission output setting calibration area while gradually varying the emission output, the calibration area being provided in a disk separately from the program area where actual recording data is to be recorded.

During recording, the reflection level of a recording pulse is detected as data is recorded onto a disk using an emission output set at an optimum recording level through the trial writing, and the emission output is further corrected according to the detected reflection level, whereby the emission output for actual data recording is adjusted to a more optimum recording level.

Here, even though an emission output from an optical head is set at an optimum recording level for disk recording, as described above, when an inferior disk is used, recording data may not be properly recorded. Moreover, an ATIP address for absolute time information in ATIP (absolute time in pre-groove) may not be restored from a wobble signal extracted from a pre-groove of a disk. This may disrupt the recording.

Recording may also be disrupted when actual recording speed deviates significantly from a disk's adaptable recording speed.

SUMMARY OF THE INVENTION

According to the present invention, when recording conditions are inferior, a recording speed is corrected stepwisely until a recording speed allowing proper disk recording is set. With this arrangement, when a disk recording condition is inferior, the recording is discontinued to prevent recording failure.

DESCRIPTION OF THE PREFERRED EMBODIMENTS

Figure 1:
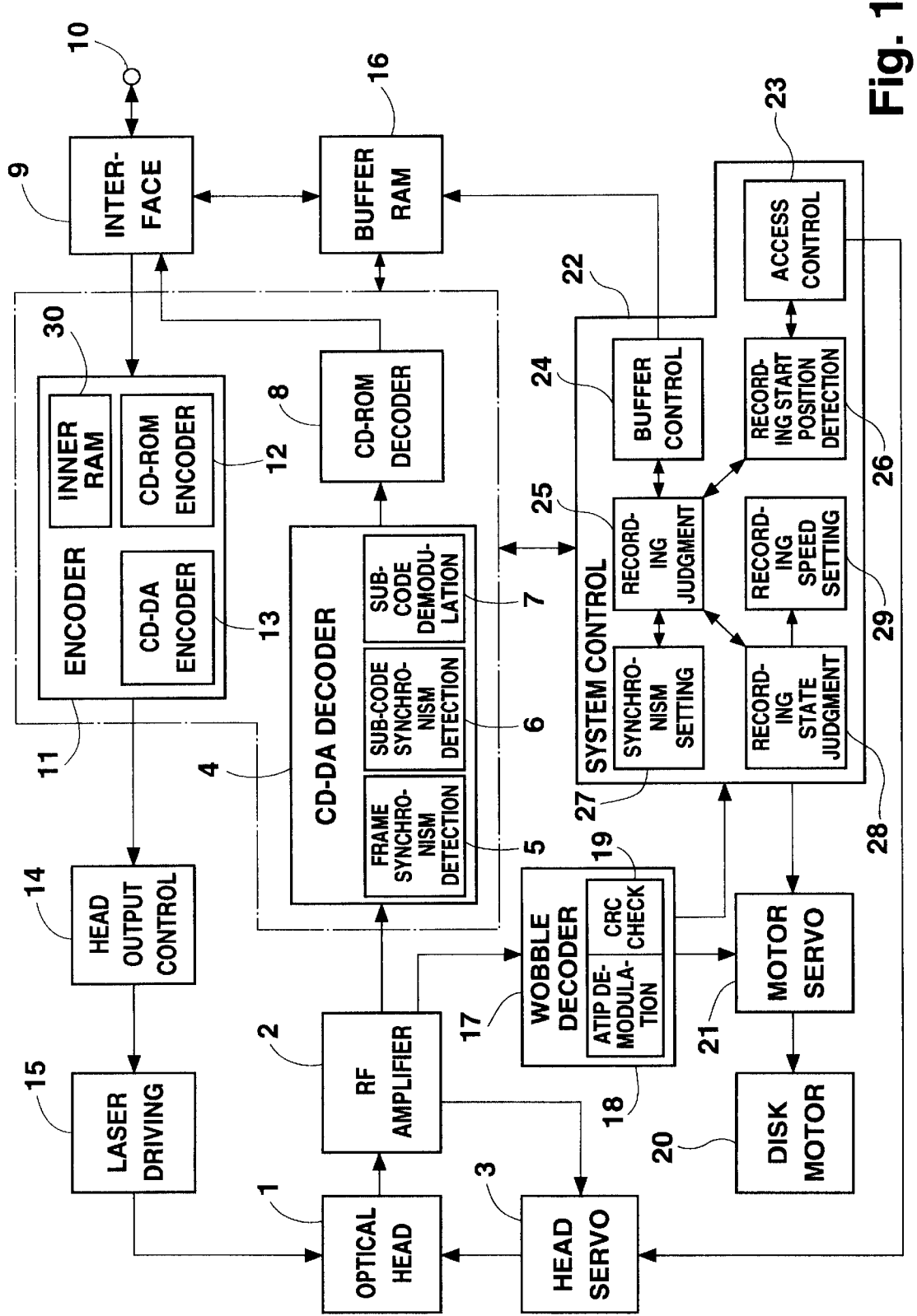
FIG. 1 is a circuit block diagram showing an exemplary embodiment of a CD-R drive as a disk recording device according to the present invention.

FIG. 1 is a circuit block diagram showing an exemplary CD-R drive as a disk recording device according to the present invention.

Referring to FIG. 1, an optical head 1 emits a laser beam for tracing a disk so that recording data is written on a disk, or so that recorded data is read from a disk.

An RF amplifier 2 amplifies an RF signal (a radio frequency signal) of a received light output obtained by the optical head 1, and binarizes the RF signal. A head servo circuit 3 performs focusing control, tracking control, and thread feed control based on feedback of various received light outputs obtained in the optical head 1. Through the focusing control, a laser from the optical head 1 is focused on a signal plane of the disk. Through the tracking control, the laser tracks the signal track of the disk. Through the thread feeding control, the optical head 1 is fed in the radial direction of the disk.

A CD-DA decoder 4 demodulated binary data of an RF signal from the RF amplifier 2 in synchronism with a bit clock, in a range defined in a signal format of an audio CD-DA disk. The CD-DA decoder 4, which comprises a frame synchronism detection section 5, a sub-code synchronism detection section 6, and a sub-code demodulation section 7, separates various data from the supplied binary data of an RF signal to restore EFM (eight to fourteen modulation) data through EFM demodulation. Further, the CD-DA decoder 4 detects a frame synchronism signal indicative of the head of a frame of EFM data (EFM frame), using the frame synchronism detection section 5, and a synchronism signal in a sub-code constituited of ninety-eight EFM frames, using the sub-code synchronism detection section 6, and restores (demodulates) a sub-code using the sub-code demodulation section 7.

A CD-ROM decoder 8 decodes demodulated data restored in the CD-DA decoder 4, in a range defined by a signal format of a CD-ROM disk. The CD-ROM decoder 8 detects synchronism of CD-ROM data defined in a signal format of a CD-ROM disk, and conducts error detection and error correction according to EDC (error detection code) and ECC (error correction code) for CD-ROM data.

An interface 9 controls data transmission with respect to a host device, such as a personal computer, which is externally connected via a connection terminal 10. An encoder 11 modulates recording data input via the interface 9, into recording data for disk recording. The encoder 11 comprises a CD-ROM encoder 12 and a CD-DA encoder 13. The CD-ROM encoder 12 imparts synch-data, a header, and EDC and ECC for a CD-ROM to input data according to CD-ROM standard. The CD-DA encoder 13 imparts a CIRC (cross interleave read-solomon code) as an error correction code in a CD-DA format to the CD-ROM data from the CD-ROM encoder 12, according to CD-DA standard. The CD-DA encoder 13 further imparts a sub-code, conducts EFM processing, and also imparts a frame synchronous signal to the CD-ROM data.

A head output control circuit 14 supplies a control output for controlling a laser beam from the optical head 1 based on the recording data in the form of EFM data output from the encoder 11. The laser driving circuit 15 drives a laser light source of the optical head 1 to perform disk recording according to a control output from the head output control circuit 14. That is, when recording, the laser driving circuit 15 sets the level of light emission from the laser light source of the optical head 1 to a recording level strength appropriate for disk recording. When the laser driving circuit 15 sets the laser light source of the optical head 1 so as to emit light, a "1" signal, constituting recording data, is recorded onto the disk. Meanwhile, when the laser driving circuit 15 sets the laser light of the optical head 1 so as not to emit light, a "0" signal, constituting recording data, is recorded onto the disk.

A buffer RAM 16 caches input data supplied via the interface 9, and is used when the cashed data is modulated (encoded) in the encoder 11 into recording data for disk recording. The buffer RAM 16 also caches data read from a disk, and is used when the cached data is demodulated (decoded) in the CD-DA decoder 4 and the CD-ROM decoder 8.

A wobble decoder 17 comprises an ATIP demodulation circuit 18 and a CRC check circuit 19. The ATIP demodulation circuit 18 demodulates a push-pull signal, which is generated in the RF amplifier 2 using a push-pull method, to restore a wobble signal of 22.05 kHz, contained in a pregroove of a disk, and further demodulates the wobble signal to restore an ATIP (absolute time in pre-groove) address, which is a time information address. The CRC check circuit 19 conducts error detection based on a CRC (cyclic redundancy code) to an ATIP address.

A disk motor 20 drives a disk to rotate. A motor servo circuit 21 is responsible for driving control of the disk motor 20. The motor servo circuit 21 can conduct rotation control using a constant linear velocity method when reproducing a disk containing signals having been recorded thereinto using a constant linear velocity method. The motor servo circuit 21 can also conduct rotation control using a constant angular velocity method. When disk recording, the motor servo circuit 21 conducts rotation control using a wobble signal restored in the wobble decoder 17.

A system control circuit 22 is responsible for system control in connection with data recording onto and reproduction from a disk. The system control circuit 22 comprises an access control section 23, a buffer control section 24, a recording judgement section 25, a recording start position detection section 26, a synchronism setting section 27, a recording condition judgement section 28, and a recording speed setting section 29. The access control section 23 controls accesses to the disk with selective reference to a sub-code address and an ATIP address, the sub-code address being absolute time information in a sub-code (sub Q data) restored in the sub-code demodulation section 7, and the ATIP address being restored in the ATIP demodulation circuit 18. The buffer control section 24 controls data writing into and reading from the buffer RAM 16. The recording judgement section 25 determines discontinuation or start of data recording with respect to a disk according to the amount of data accumulated in the buffer RAM 16, which is controlled by the buffer control section 24, or in response to an instruction supplied from a host device, connected to the connection terminal 10. In response to the decision by the recording judgement section 25 to resume recording, the recording start position detection section 26 detects a point successive to the end of the recording data recorded as being broken off due to discontinuation of the recording, as a point at which to resume recording. The synchronism setting section 27 synchronizes recording data for subsequent disk recording with the recorded data in the disk, using a sub-code synchronous signal and sub Q data, the sub-code synchronous signal being detected by the sub-code synchronism detection section 6, and the sub Q data being restored in the sub-code demodulation section 7. The recording condition judgement section 28 judges recording condition of recording data for disk recording. The recording speed setting section 29 sets a recording speed of a disk according to a recording speed requested by a host device, connected to the connection terminal 10, by controlling the encoder 11, the head output control circuit 14, aid the motor servo circuit 21. The respective sections 23 to 29 of the control circuit 22 may be separate circuits, or achieved by sections of software in a microcomputer.

The recording judgement section 25 determines whether or not to discontinue the recording based on the judgement on the recording condition by the recording condition judgement section 28. In response to a decision by the recording judgement section 25 to discontinue the recording, the recording speed setting section 29 reduces the recording speed by one step. In the above, the recording condition judgement section 28 judges recording condition by detecting a situation which may lead to a failure of disk recording by detecting a predetermined number of successive generations of CRC errors in the CRC check circuit 19, a CRC error indicating impossibility of detection of an error in an ATIP address, which is restored in the ATIP demodulation circuit 18.

When more than a predetermined number of CRC errors are successively generated and an ATIP address cannot be properly restored within a predetermined period, a recording position on a disk cannot be detected. This may lead to a failure of recording. To avoid this, the recording condition judgement section 28 determines, prior to failure of recording, a situation which may lead to a failure of recording when a period in which CRC errors are successively generated approaches near a limit beyond which recording failure is likely.

Next, recording operation of the thus structured disk recording device will be described.

Upon receipt of a recording request from a host device connected to the connection terminal 10, disk recording operation is started. Specifically, the recording speed setting section 29 controls the encoder 11, the head output control circuit 14, and the motor servo circuit 21 according to the requested recording speed, to set a disk recording speed.

Then, an emission output of the optical head 1 is set at an optimum recording level at the recording speed set, in order to achieve optimum disk recording such that the recorded data would be reproduced with the smallest possible error rate. The setting of the emission output at the optimum recording level is achieved through trial writing with the emission output, while gradually varying the emission output, into a calibration area, which is provided in the innermost round of the disk.

When the host device, connected to the connection terminal 10, outputs data for requesting recording, the requesting data is received via the interface 9, and then written into the buffer RAM 16.

When such data has been accumulated in the buffer RAM 16 to an amount where the encoder 11 starts encoding, the accumulated data is read from the buffer RAM 16, and modulated (coded) in the encoder 11 into recording data for disk recording for every EFM frame (EFM data).

Here, when the optical head 1, while tracing the disk, reaches a recording start position on the disk, the encoder 11 sequentially outputs recording data for every EFM frame. Then, address data on an ATIP address, restored in the ATIP demodulation circuit 18, corresponding to the output recording data is sequentially updated, and stored in a memory (not shown).

Under control by the head output control circuit 14, the laser driving circuit 15 controls the laser light source of the optical head 1 to drive, based on the recording data output from the encoder 11, so that recording data is recorded onto the disk.

Here, when disk recording, a wobble signal, contained in a pre-groove of the disk, is restored in the wobble decoder 17 and an ATIP address is restored in the ATIP demodulation circuit 18 for the purpose of disk rotation control, restoration of a sub Q address of a sub-code contained in recording data, and detection of a recording position on the disk. In addition, the CRC check circuit 19 detects whether or not error detection is possible with the ATIP address, and, when it is not, issues a CRC error signal.

When actual recording speed exceeds a disk adaptable recording speed and an ATIP address is not restored from a wobble signal, the CRC check circuit 19 generates a CRC error. When this occurs a predetermined number of successive times, the recording condition judgement section 28 determines that a situation which may lead to a failure of disk recording exists and informs the recording judgement section 25. Upon learning of such a decision, the recording judgement section 25 decides to discontinue disk recording.

In response to the decision by the recording judgement section 25 to discontinue disk recording, the encoder 11 suspends encoding of input data and the head output control circuit 14 suspends supply of a control output for controlling the laser driving circuit 15. As a result, the optical head 1 suspends irradiation of a laser, which was set for recording, thereby effecting suspension of disk recording. It should be noted that in this instance the encoder 11 does not generate a run-out block for binding recording data, and disk recording is thus suspended without the recording of such a run-out block.

Also, when the recording condition judgement section 28 determines that disk recording is about to fail and the recording judgement section 25 accordingly determines to discontinue the recording, the recording speed setting section 29 reduces the recording speed by one step. Accordingly, the encoder 11, the head output control circuit 14, and the motor servo circuit 21 then operate according to the newly set recording speed, and the host device, connected to the connection terminal 10, is informed of that fact.

For a disk recording device adapted to a 12×recording speed, for example, one step may be preset to a value of 2 so that a recording speed nay be successively reduced from 12×to 10×to 3×and so on when the recording speed setting section 29 reduces the recording speed by one step. For high speed recording, such as at a 12×or 10×speed, one step may be set to a level of 4 so that recording speed may be similarly reduced in steps from 12×to 8×to 4×and so on, or from 10×to 6×to 2×.

While a recording speed is reduced by the recording speed setting section 29 as described above, an emission output of the optical head is set again at the optimum recording level at the reduced respective recording speeds through trial writing into the calibration area. Then, the recording judgement section 25 decides to resume disk recording, and the encoder 11 thereupon resumes encoding.

Encoding in the encoder 11 is resumed by encoding data immediately before the discontinuation of the recording, which is stored in the RAM 30 in the encoder 11, and followed, immediately after resumption, by the encoding of recording data successive to the recorded data having been encoded and recorded on the disk before the recording discontinuation.

Here, in response to the decision by the recording judgement section 25 to resume disk recording, the head output control circuit 14 controls the optical head 1 to set the emission output thereof at a reproduction level output. Moreover, a portion close to the end of the recorded data on the disk is accessed with reference to an ATIP address stored at the time of discontinuation.

Thereafter, the recording start position detection section 26 detects the last end of the recorded data on the disk, which had been recorded immediately before the discontinuation of the recording, and then detects, as a recording start position, the beginning of an unrecorded area successive to the detected last end of the recorded data on the disk.

The detection of a recording start position by the recording start position detection section 26 is made as follows. When a portion around the last end of the recorded data on the disk is accessed in response to the decision by the recording judgement section 25 to start recording, the optical head 1, while tracing in a reproduction mode, accesses an EFM frame one sub-code address prior to the sub-code address corresponding to the ATIP address which was stored at the time of discontinuation, with reference to the stored ATIP address. Thereafter, a frame synchronism signal is detected to counting EFM frames until the last EFM frame of a sub-code frame corresponding to the sub-code address is detected. When a frame synchronism signal of the last EFM frame is detected, a bit clock is then counted to thereby detect the last end position of the recorded data on the disk.

When the optical head 1, which is tracing in the reproduction mode, accesses a portion close to the trailing end of the recorded data by the optical head 1 when detecting the recording start position on the disk, the CD-DA decoder 4 starts decoding in synchronism with a reproduction clock reproduced from EFM data. Moreover, the encoder 11 is caused by the synchronism setting section 27 to encode in synchronism with the reproduction clock. As a result, recording data, generated by the encoder 11, is synchronized with the data recorded on the disk.

Once a recording start position on the disk has been detected, the encoder 11 switches to encode according to a recording clock, rather than a reproduction clock. Examples of preferable recording clocks include a reference clock with quartz movement accuracy generated in a PLL (phase lock loop) circuit or a system clock in synchronism with a bit clock of a wobble component.

Once the operation clock for the encoder 11 has been switched from a reproduction clock to a recording clock, the encoder 11 starts encoding in synchronism with the recording clock. Moreover, the head output control circuit 14 starts to supply a control output, based on the recording data, prepared in the encoder 11 for additional writing onto a disk so as to succeed to the recorded data, as a result of which recording of the additional recording data is started at the beginning of the unrecorded area on the disk, in synchronism with the recorded data. It should be noted that, at this time, the encoder 11 does not generate a link and run-in block for bonding the recording data, and disk recording is thus resumed without the recording of such link and run-in blocks.

It should further be noted that disk recording is resumed at a recording speed one step slower than the initially set recording speed. When a situation which may lead to a failure of the disk recording is not detected by the recording condition judgement section 28, disk recording is continuously applied at this recording speed one step slower than the initially set recording speed.

However, should the recording condition judgement section 28 then again detect a situation which may lead to a failure of the disk recording, or should the recording actually fail, the recording speed is slowed by an additional step and subsequent disk recording is performed at a recording speed a further step slower than the initial speed.

As described above, recording speed is gradually reduced until a recording speed at which disk recording can be performed without a failure is finally set.

In the present invention, formation state of the recorded data is detected when recorded data is read from the disk so that the synchronism setting section 27 synchronizes recording data for additional writing with the recorded data, and the head output control circuit 14 controls the laser driving circuit 15 according to the detected formation state of the recorded data. With this arrangement, for additional writing a recording level of the optical head 1 can be corrected according to the formation state of the data recorded on the disk. This makes it possible to adjust the optical head 1 to an optimum recording level suitable for actual recording. Formation state of the recorded data may be detected while referring to an RF signal waveform generated in the RF amplifier 2.

It should be noted that, while in the above example recording is discontinued after once being started and before it is completed, the present invention may be also preferably applied to a case where recording is stopped and a recording speed is accordingly reduced by one step in response to an error signal generated before the recording is actually started.

As described above, in the preferred embodiment, when the recording speed set is in excess of a disk adaptable recording speed, the recording speed is varied stepwisely until a disk adaptable recording speed is set. In this case, additional recording data is recorded so as to precisely succeed to and be synchronized with the recorded data having been recorded in the disk immediately before the recording discontinuation. With this arrangement, disk recording failure can be prevented while data is continuously recorded onto a disk with data successiveness ensured between, before, and after the recording data connection due to additional disk writing.

In addition, because the disk recording condition is determined according to whether or not error detection is possible with a time information address contained in a wobble signal, judgement of the recording condition can be efficiently made simultaneously with disk recording, without interrupting the recording process.

What is claimed is:

1. A disk recording device for recording data onto a disk, using an optical beam from an optical head, comprising:
a recording speed setting section for setting a recording speed while switching a rotation speed of the disk during data recording to one of a plurality of speeds; and
a recording condition judgement section for judging recording condition with reference to a signal read from the disk,
wherein
the recording speed setting section stepwisely changes the rotation speed in the recording speed setting section according to a result of judgement by the recording condition judgement section,
further comprising a wobble recorder for restoring a wobble signal contained in a pre-groove of the disk to restore a time information address contained in the wobble signal restored, and
wherein
the recording condition judgement section detects an error in the time information address.

2. A disk recording device according to claim 1, wherein
the recording condition judgement section detects a reading error state with reference to the signal, and
the recording speed setting section changes the recording speed to a recording speed one step slower when a result of judgement indicates a reading error exceeding a predetermined level.

3. A disk recording device according to claim 1, wherein the recording condition judgement section makes judgement based on a result of detection of an error in the time information address.

4. A disk recording device according to claim 1, further comprising:
a recording start position detection section for detecting a recording start position at which additional data recording onto the disk is started, and
a synchronism setting section for synchronizing recording of additional data writing with recorded data read from the disk.

* * * * *